G. W. BIERER.
ANTISKIDDING PROTECTOR.
APPLICATION FILED JULY 15, 1909.
969,744. Patented Sept. 6, 1910.
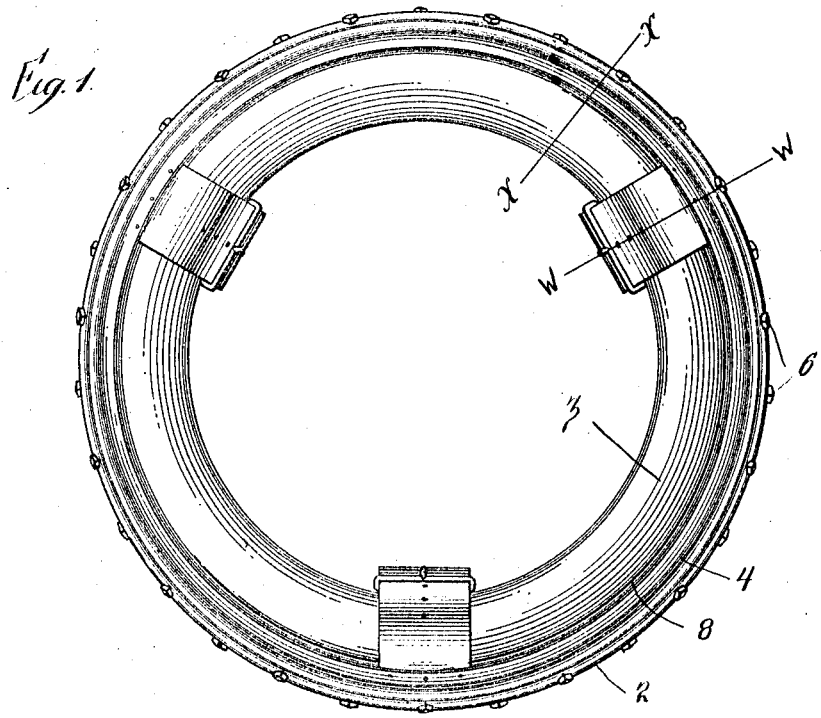
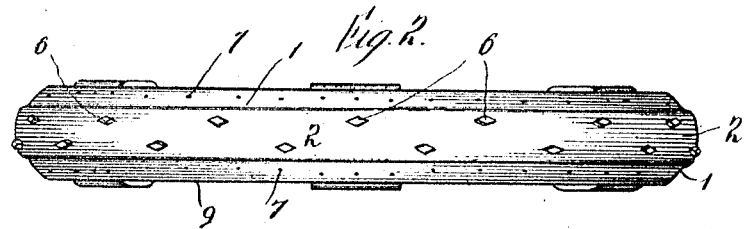
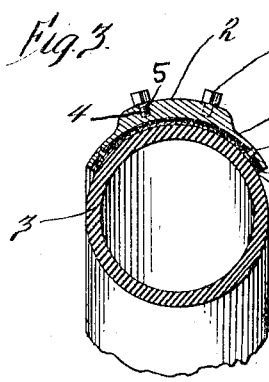 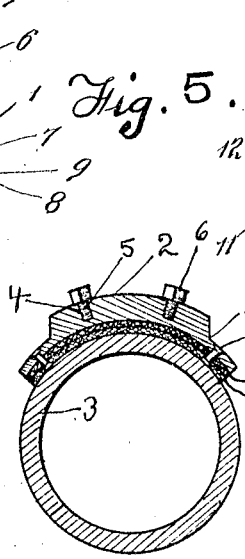 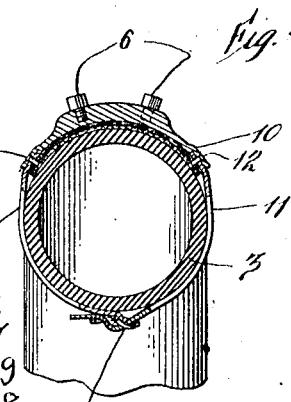
Witnesses
Inventor
G. W. Bierer
BY
Attorneys

UNITED STATES PATENT OFFICE.

GEORGE W. BIERER, OF PITTSBURG, PENNSYLVANIA.

ANTISKIDDING PROTECTOR 969,744.   Specification of Letters Patent.   Patented Sept. 6, 1910.

Application filed July 15, 1909. Serial No. 507,835.

*To all whom it may concern:*

Be it known that I, GEORGE W. BIERER, a citizen of the United States of America, residing at Pittsburg, in the county of Allegheny and State of Pennsylvania, have invented certain new and useful Improvements in Antiskidding Protectors, of which the following is a specification, reference being had therein to the accompanying drawing.

This invention relates to anti-skidding protectors for the peripheries of wheels and more particularly to that class commonly styled "guards or armors" for the wheels of automobiles, motor cycles, and similar vehicles.

The invention has for its primary object to provide a novel tread that will prevent rubber tired vehicles from skidding or sliding on wet, slippery or muddy roads, at the same time preventing the tires from being punctured by glass, sharp stones or irregularities in a road.

Another object of the invention is to provide a tread for rubber tired wheels that will not interfere with the pneumatic cushion properties of the wheel.

A further object of the invention is to provide a tread constructed to eliminate noise and reduce the maintenance expense in connection with a motor driven vehicle.

These and such other objects as may hereinafter appear are obtained by a device that will be hereinafter considered in detail and then claimed.

Reference will now be had to the drawings wherein is illustrated a preferred embodiment of the invention; but it is to be understood that the structural elements thereof are susceptible to change without departing from the spirit of the invention.

In the drawings, Figure 1 is a side elevation of the tire provided with my improved tread. Fig. 2 is a plan of the same. Fig. 3 is a cross-sectional view taken on the line XX of Fig. 1. Fig. 4 is a similar view taken on the line WW of Fig. 1, and Fig. 5 is an enlarged cross-sectional view of the armor and layers.

My improved tread is constructed of light and durable metal shaped to provide a circular tread or band 1 having a central angular peripheral enlargement 2, said tread or band being arched in cross section to conform to the tread or exposed surface of a tire 3.

The enlargement 2 is provided throughout with staggeredly arranged interiorly threaded sockets 4 to receive the threaded shanks 5 of anti-skidding pins or buttons 6, which are preferably diamond-shaped in plan, thus allowing a spanner wrench or similar instrument to be used to rotate the pins or buttons 6.

Riveted or otherwise secured to the tread or band 1, as at 7 is a piece of canvas 8, and interposed between the band 1 and the canvas 8 is an asbestos filler 9. The canvas 8 is employed to prevent the band 1 from injuring the tire 3, while the asbestos filler 9 prevents heat from affecting and deteriorating the composition of the tire.

The edges of the band 1 are offset, as at 10 to receive the ends of straps 11 which are riveted to the band 1, as at 12. Three sets of these straps are equally spaced relative to the band 1 and each set of straps is connected by a buckle 13 in order that the tread or band 1 will be firmly held upon the tire 3. It is in connection with the straps 11 that I reserve the right to use any number necessary, or to entirely eliminate the straps. It is apparent that when the tire 3 is collapsed that it can easily be placed within the band 1 and when blown up or filled with air it will firmly hold the tread or band without the use of straps.

Having now described my invention, what I claim as new is:

An armor for pneumatic tires comprising a band having a circumferentially extending peripheral enlargement positioned at a point removed from each side and edge of the band whereby the band at each side of the enlargement will be of less thickness than said enlargement, said enlargement provided throughout with two circumferentially extending series of threaded sockets of a depth less than the thickness of the enlargement, each series arranged in proximity to an edge of the enlargement, a headed pin having a screw threaded shank detachably engaging in each of said sockets, the heads of said pins abutting against said enlargement, an asbestos filler arranged against the inner face of said band, a canvas strip positioned against said asbestos filler, and a circumferentially-extending series of holdfast devices extending through reduced portions of the band and the asbestos and canvas for connecting the band and canvas together.

In testimony whereof I affix my signature in the presence of two witnesses.

GEORGE W. BIERER.

Witnesses:
 MAX H. SROLOVITZ,
 DAVID FURNIER.